May 22, 1951  C. P. WAGNER ET AL  2,553,991
DRAIN CONTROL VALVE
Filed Aug. 6, 1946

INVENTOR.
CLETUS P. WAGNER
FRANK R. HOLYCROSS JR.
BY
Kwis, Hudson, Boughton & Williams
ATTORNEYS Patented May 22, 1951

2,553,991

UNITED STATES PATENT OFFICE 2,553,991

DRAIN CONTROL VALVE

Cletus P. Wagner and Frank R. Holycross, Jr., Marysville, Ohio, assignors to H. B. Salter Manufacturing Company, Marysville, Ohio, a corporation of Ohio Application August 6, 1946, Serial No. 688,678

2 Claims. (Cl. 137—139)

This invention relates to drain controls, that is to say drain valves or plugs of the pop-up type, together with mechanism for operating the same.

One of the objects of the invention is the provision of a housing that is removably attached to the upright waste pipe, and within which the plug actuating lever and associated parts are mounted, and by which they are protected.

Another object is the provision of a ball mounting for the lever which is spring pressed into engagement with a packing ring, whereby the ball in addition to forming a trunnion for the lever serves in connection with said packing to seal the end of the housing.

Still another object is the provision of a novel snapover lever mounting.

Other objects and features of novelty will appear as we proceed with the description of that embodiment of the invention which, for the purposes of the present application, we have illustrated in the accompanying drawing, in which Fig. 1 is an elevational view of a lavatory waste pipe and drain plug embodying the invention.

Figure 1:
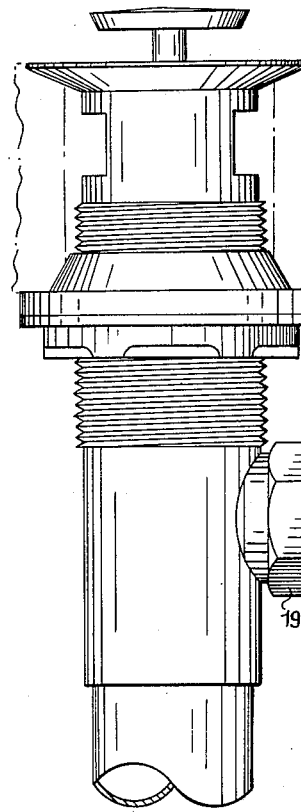

While the invention is illustrated herein as applied to waste plugs for lavatory drains, it has application in at least some of its aspects to drains for other purposes. In the drawing 10 indicates the bowl of a lavatory, provided with the usual drain opening 11, the upper end of which is bevelled off to receive the bevelled flange 12 at the upper end of a waste pipe 13. 14 is a rubber gasket engaging the bowl 10 at the lower end of opening 11. A metal washer 15 engages the lower surface of gasket 14, and a nut 16 threaded upon the pipe 13 bears against washer 15 and when threaded up tightly locks the foregoing parts together.

In one side of waste pipe 13 there is an opening 17 which is threaded to receive the threaded inner end of a housing 18 which it is convenient to form in two parts 19 and 20. The joint between part 19 and the pipe 13 may be sealed by a gasket 21. The two parts 19 and 20 are threaded together as indicated at 22 and the joint between them is sealed by a gasket 23. The housing 18 is therefore readily removable and its two parts 19 and 20 are readily separable.

The upper end of waste pipe 13 has a tapered seat 24 which is adapted to be engaged by the bevelled edge of a valve plug 25 on the upper end of a stem 26 which extends downwardly into proximity with the opening 17. At an intermediate point stem 26 has a plurality of evenly spaced wings 27 which center the stem in the pipe and cause it to move axially when the valve is opened or closed.

Figure 5:
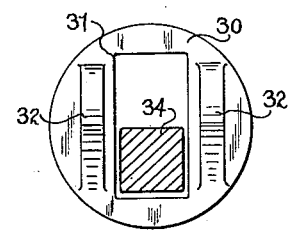
Fig. 5 is a cross-sectional view on a larger scale taken substantially on the line 5—5 of Fig. 2.

Part 19 of housing 18 has a recess 28 with a cylindrical wall ending in an annular shoulder 29 which forms an abutment for a circular disk 30 that is loosely mounted in the recess. This disk has an elongated slot 31 therethrough, see particularly Fig. 5. On one face it is provided with integral cam shaped projections 32 of approximately triangular form disposed alongside the slot 31.

The apparatus comprises an actuating lever which is preferably formed in two sections 33 and 34 that are connected together by being threaded into a ball 35 that is flattened on its inner side. The diameter of this ball is only slightly less than the internal diameter of the housing part 20, so that the center of the ball is maintained at the axis of the housing. It bears against a resilient packing ring 36 disposed in the outer end of the housing surrounding an end opening 37 thereof.

The lever section 34 where it projects through the slot 31 in disk 30 is flat sided, whereby relative rotation between the lever and the disk is prevented. The inner end of the lever is formed as a loop 40. It is engaged normally on its underside by a depending T-head 41 at the lower extremity of stem 26, and on its upper side by a projection 42 of the stem. This connection is subject to disengagement when desired. When the valve is open the plug 25 may be grasped by the operator and turned through an angle of 90° from the position shown, whereupon the plug and stem may be lifted, the head 41 passing through the loop 40. It will be evident that when the parts are in operative position movement of the actuating lever to raise loop 40 will cause the loop to engage the projection 42 and lift the stem and plug, while movement of the lever in the opposite direction will cause the loop to press downwardly upon the T-head 41. In other words the stem and plug are moved positively in both directions. Between the loop 40 and the flat sided part of lever section 34 there is a reduced diameter portion 43 which is required for separation of the lever from the disk after the stem has been disconnected as above explained, that is to say the lever is drawn outwardly until the reduced portion 43 is positioned within the slot 31, when the lever may be turned through a 90° angle thereby permitting the loop 40 to be drawn into the slot.

Figure 6:
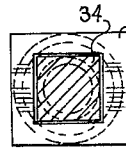
Fig. 6 is a detail sectional view taken substantially on the line 6—6 of Fig. 4.
Figure 3:
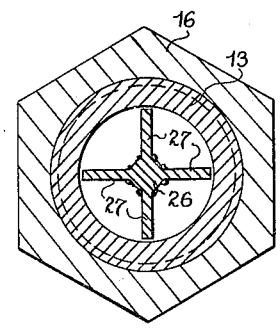
Fig. 3 is a cross-sectional view taken substantially on the line 3—3 of Fig. 2.

On the lever section 34 within the housing part 20 there is a slide 45 which is caused to bear against the projections 32 by a compression spring 46, one end of which engages the slide and the other end of which bears against the flattened part of ball 35. Slide 45 preferably has lateral projections 47 for engagement with the projections 32 on the disk, and in order to maintain projections 47 in proper position for this purpose means is provided to mount the slide 45 non-rotatably upon the lever section. To do this it is convenient to continue the rectangular cross-section of part 34 of the lever outwardly from the part which extends through the slot 31 and to provide the slide with a correspondingly shaped hole for engagement with the lever, as shown in Fig. 6. It will be observed that the spring 46 holds the projections 47 against the disk 30 and thereby presses the disk against the abutment 29, while at the same time it forces the ball 35 against the gasket 36 for sealing the outer end of housing 18.

With the parts in operative position stem 26 by engagement with the loop 40 prevents rotation of the lever around its own axis. The flat sided lever disposed within the slot 31 prevents rotation of the disk 30. The lever being held against rotation about its axis permits motion of the ball 35 about a transverse horizontal axis only. Any convenient manual means may be employed for swinging the lever up and down about this transverse axis. It is not essential that both of the members 30 and 45 have projections. In fact either set of projections 32 or 47 may be omitted if desired, although the construction illustrated is preferred.

Figure 2:
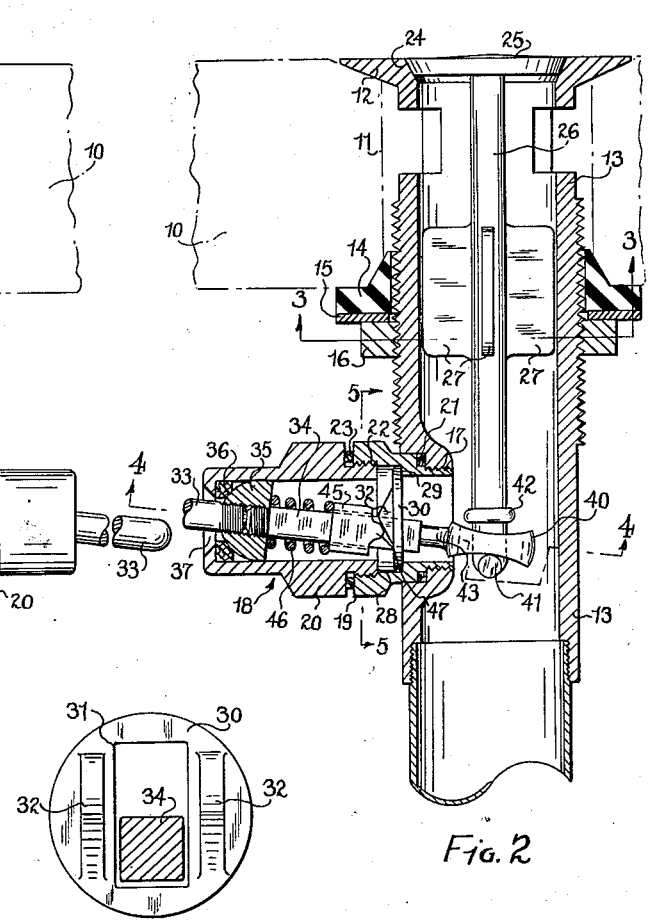
Fig. 2 is a vertical central section of the same viewed from the rear side of Fig. 1.
Figure 4:
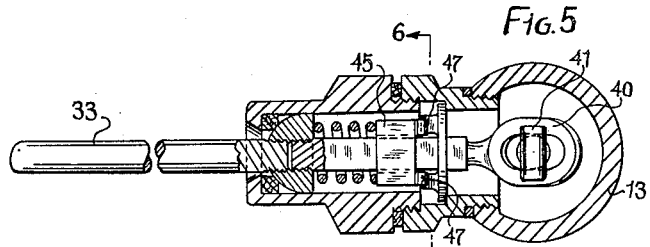
Fig. 4 is a view, principally in section on the line 4—4 of Fig. 2.

In the position of the parts illustrated in Figs. 2 and 4 there is a cam effect exerted by the inclined lower sides of the projections 32 upon the projections 47 of the slide which, under the influence of the spring 46, tends to force the right hand end of the lever downwardly and exert downward pressure through the loop 40 upon the T-head 41 of stem 26. In order to open the valve, pressure must be exerted manually upon the outer end section 33 of the lever. This manual pressure working in opposition to spring 46 cams the projections 47 upwardly, moving the slide 45 outwardly and compressing spring 46 until projections 47 ride over the high points of projections 32, whereupon the manual pressure may be relieved and the spring 46 will cause the projections 47 to move along the upper surface of the projections 32 away from the high points thereof. This will swing the lever section 34 upwardly and cause loop 40 to exert upward pressure on the projection 42 of stem 26, opening the valve and holding it open.

In case hair or other foreign matter should collect in the drain pipe below the plug 25, cleaning may be done quickly and easily. The lever is shifted to valve opening position, whereupon plug 25 may be grasped and turned through an angle of 90°, lining up the T-head 41 with the opening in loop 40 and enabling the plug and stem to be lifted out. The construction also permits easy removal of the snap-over operating mechanism, for with the plug and stem removed a wrench may be applied to the hexagonal surface of housing part 20 and that part of the housing may be unthreaded from part 19, after which the lever and all of its associated parts are exposed. If there is any occasion to separate the disk 30 from the lever it may be moved lengthwise of the latter into register with the constriction 43 when it may be turned to line up the slot 31 with the loop 40 and then slid over the loop.

Having thus described our invention, we claim:

1. In apparatus of the character described, a vertical valve casing having a lateral opening, a pop-up valve in said casing, a housing member extending laterally from said casing surrounding said opening, a circular disk having an elongated slot therein, said disk being loosely mounted within said housing member, said housing member having a shoulder against which said disk bears, a pair of projections on one side of said disk oppositely disposed alongside said slot, a lever fulcrumed in said housing member, said lever extending through said housing member and through said slot into said casing, a connection between said lever and said valve preventing rotation of said lever around its axis, a slide non-rotatably mounted on said lever having a pair of projections adapted to engage said first named projections, resilient means for urging the slide projections against the disk projections, urging the disk against said shoulder and causing the high points of the slide projections to ride over the high points of the disk projections as the lever moves from one end of said slot to the other, the engagement of the two pairs of projections holding said disk against rotation.

2. In apparatus of the character described, a vertical valve casing having a lateral opening, a pop-up valve in said casing having a downwardly extending stem, a T-head on the lower extremity of said stem with a collar on the stem spaced upwardly from said head, a housing member extending laterally from said casing surrounding said opening, a circular disk having an elongated slot therein, said disk being rotatably mounted in said housing member, said housing member having a shoulder against which said disk bears, a pair of projections on one side of said disk oppositely disposed alongside said slot, a lever fulcrumed in said housing member, said lever extending through said housing member and through said slot into said casing, the portion extending into said casing having a slot adapted to receive the T-head of said valve stem, whereby when the valve is turned ninety degrees axial rotation of said lever is prevented, a slide non-rotatably mounted on said lever having a pair of projections adapted to engage said first-named projections, resilient means for urging the slide projections against the disk projections, urging the disk against said shoulder and causing the high points of the slide projections to ride over the high points of the disk projections as the lever moves from one end of said slot to the other, the engagement of the two pairs of projections holding said disk against rotation.

CLETUS P. WAGNER.
FRANK R. HOLYCROSS, Jr.

REFERENCES CITED

The following references are of record in the file of this patent:

UNITED STATES PATENTS

| Number | Name | Date |
|---|---|---|
| 248,076 | Weaver | Oct. 11, 1881 |
| 1,474,986 | Watrous | Nov. 20, 1923 |
| 1,647,188 | Mueller et al. | Nov. 1, 1927 |
| 1,755,776 | Eaton | Apr. 22, 1930 |
| 1,848,521 | Fleck | Mar. 8, 1932 |
| 2,092,940 | Strezoff | Sept. 14, 1937 |
| 2,265,260 | Argo | Dec. 9, 1941 |
| 2,288,767 | Young | July 7, 1942 |